United States Patent [19]

Asakura et al.

[11] Patent Number: 5,311,606
[45] Date of Patent: May 10, 1994

[54] OPTICAL FILTER AND OPTICAL AMPLIFIER EMPLOYING SAID OPTICAL FILTERS

[75] Inventors: Hiroyuki Asakura, Osaka; Masanori Iida, Neyagawa; Tetsuji Miwa, Osaka, all of Japan

[73] Assignee: Matsushita Electric Industrial Co., Ltd., Osaka, Japan

[21] Appl. No.: 14,465

[22] Filed: Feb. 5, 1993

[30] Foreign Application Priority Data

Feb. 14, 1992 [JP] Japan .................................. 4-27777

[51] Int. Cl.$^5$ .............................................. G02B 6/32
[52] U.S. Cl. ...................................... 385/33; 359/341; 359/563; 359/569; 385/37
[58] Field of Search ..................... 385/15, 31, 33, 37, 385/39; 359/558, 559, 563, 569, 570, 575, 341; 250/226, 227.18, 227.24, 237 G; 356/124, 124.5

[56] References Cited

U.S. PATENT DOCUMENTS 4,879,462  11/1989  Stephens ...................... 250/237 G
5,062,705  11/1991  Sato et al. ........................ 356/124

FOREIGN PATENT DOCUMENTS 0421926  4/1991  European Pat. Off. .
60-222815  11/1985  Japan .
4-147114  5/1992  Japan .
2240190  7/1991  United Kingdom .
91/18434  11/1991  World Int. Prop. O. .

OTHER PUBLICATIONS

M. Tachibana et al., "Erbium-Doped Fiber Amplifier with Flattened Gain Spectrum", IEEE Photonics Technology Letters, vol. 3, No. 2, Feb. 1991 pp. 118-119.

Kazuo Hagimoto, "Long-Span Gigabit/s Optical Transmission Systems Using Er-doped Fiber Amplifiers", NTT Transmission Systems Laboratories, pp. 23-28, (no date).

Primary Examiner—John D. Lee
Attorney, Agent, or Firm—Wenderoth, Lind & Ponack

[57] ABSTRACT

In an optical filter to be used for signal selection, removal of noise, equalizing the wavelength of signal light, etc. in an optical communication system, optical measurement device or the like, and in an optical amplifier employing such optical filter, signal light is dispersed at different angles according to each wavelength by a diffraction grating and the dispersed light is selectively transmitted or reflected by a transmission type spatial filter or reflection type spatial filter, and is then coupled with an output fiber bundle as non-dispersed light by the diffraction grating. Thus, the optical filter has variable wavelength pass band characteristics and the optical amplifier possesses a uniform wavelength amplification factor.

16 Claims, 12 Drawing Sheets

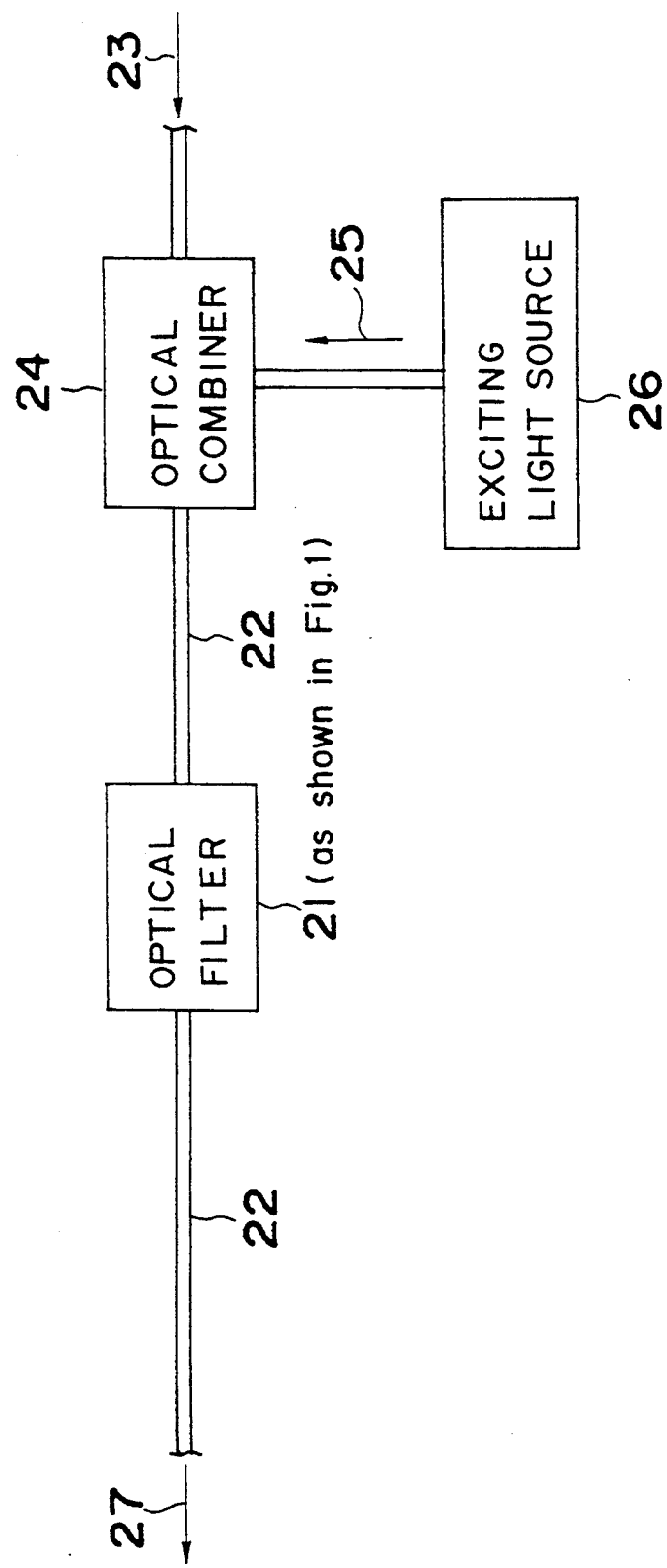

OPTICAL FILTER AND OPTICAL AMPLIFIER EMPLOYING SAID OPTICAL FILTERS

BACKGROUND OF THE INVENTION

1. Field of the Invention

The present invention generally relates to an optical filter, and more particularly, to an optical filter and an optical amplifier for use in optical communication and optical measurements, etc.

2. Description of the Related Art

Generally, in the optical communication as referred to above, optical amplifiers which amplify light as it is are employed. Through employment of the optical amplifier as a repeater or relay unit, an economical system may be constructed, since it is not required to convert light into an electrical signal. Particularly, for transmission of wavelength division multiplexed signal light, it is possible to transmit signals in large capacities for servicing, since the wavelength division multiplexed light may be amplified at one time by the optical amplifier. For such an optical amplifier, erbium-doped optical fibers have been employed. The erbium-doped optical fiber amplifier as referred to above has such advantages that it has a high amplification factor, with a superior noise characteristic (as described in Microoptics news Vol. 8, No. 1, page 23, 1990).

However, it is known that, in the optical amplifier as described above, the amplification factor thereof varies with respect to the wavelength of its incident signal light, and such wavelength dependency is shown by a dotted line in FIG. 4. Therefore, when the wavelength division multiplexed light is collectively amplified for transmission by connecting the optical amplifiers in many stages, intensities of the signal light for respective wavelengths markedly differ at the receiving point. Thus, depending on channels, received signal power level may vary, with generation of cross talk, thus resulting in a deterioration in the sensitivity for the reception. Accordingly, in order to transmit the wavelength division multiplexed signal in the equal power level, an equalizer or filter is required for smoothing a wavelength depending characteristic. As the optical filters currently used, those employing dielectric multi-layered films are widely utilized. Since the optical characteristics of such an optical filter are determined by the construction of the dielectric multi-layered film, it is difficult to obtain a sharp characteristic or a specifically desired passing characteristic. Moreover, part of the optical fiber amplifier is held between a flat plate and a refraction grating, thereby constituting the filter (IEEE PHOTONICS TECHNOLOGY LETTERS VOL. 3 NO.2 February 1991 P. 118-120).

However, with the conventional optical filter as described above, not any desired wavelength characteristic can be obtained. Furthermore, in the construction to be held between two plates, the size of the entire optical filter becomes large at 40 cm, and in the optical filter of this type, the filter characteristic is unstable, since the filter characteristics are adjusted by the pressure of the two plates. Thus, there have been various problems to be solved in the known optical filter.

SUMMARY OF THE INVENTION

Accordingly, an essential object of the present invention is to provide an optical filter which is capable of setting wavelength pass-band characteristics, and an optical amplifier employing said optical filter, with small wavelength depending characteristics.

Another object of the present invention is to provide an optical filter and an optical amplifier of the above described type, which have a simple structure and function stably with high reliability, and can be readily manufactured at a low cost.

In accomplishing these and other objects according to one embodiment of the present invention, there is provided an optical filter which includes an input fiber bundle and an output fiber bundle for guiding light, diffraction grating means disposed beside the input and output fiber bundles, and a spatial filter provided beside said diffraction grating means, respectively, with lens means interposed therebetween. The optical filter is capable of possessing various wavelength pass-band characteristics due to the use of said spatial filter.

In another embodiment of the present invention, the optical filter includes an input fiber bundle and an output fiber bundle for guiding light, diffraction grating means disposed beside said input and output fiber bundles with lens means interposed therebetween, a reflecting mirror disposed beside said diffraction grating means with another lens means interposed therebetween. The optical filter is capable of possessing various wavelength pass-band characteristics by altering space reflectance of said reflecting mirror.

The present invention as described above, thus provides a compact optical filter which is capable of transmitting wavelength multiple signal light distributions and can be advantageously provided at a low cost.

BRIEF DESCRIPTION OF THE DRAWINGS

These and other objects and features of the present invention will become apparent from the following description taken in conjunction with the preferred embodiment thereof with reference to the accompanying drawings, in which:

FIG. 6 is a schematic block diagram of the optical amplifier according to the present invention.

DETAILED DESCRIPTION OF THE INVENTION

Figure 1:
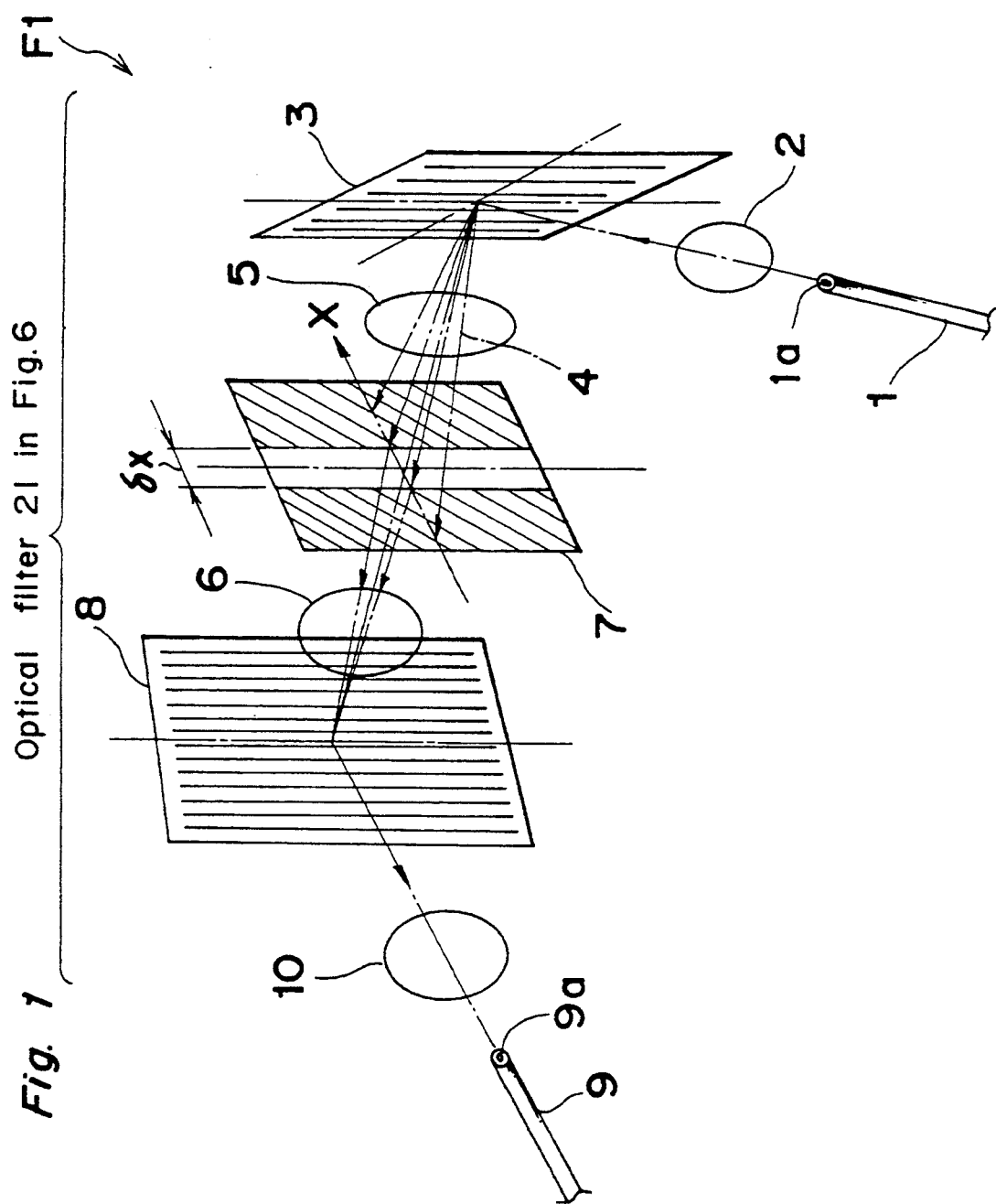
FIG. 1 is a schematic perspective diagram of one preferred embodiment of an optical filter according to the present invention.

Before the description of the present invention proceeds, it is to be noted that like parts are designated by like reference numerals throughout the accompanying drawings.

Referring now to the drawings, there is shown in FIG. 1, one preferred embodiment of an optical filter F1 according to the present invention which generally includes an input fiber bundle 1 and an output fiber bundle 9 for guiding light, first and second diffraction gratings 3 and 8 disposed beside the input and output fiber bundles 1 and 9, with a transmission type space filter 7 provided beside the first and second gratings 3 and 8, a first lens 2 disposed between the input fiber bundle 1 and the first diffraction grating 3, a second lens 5 disposed between the first diffraction grating 3 and the space filter 7, a third lens 6 disposed between the space filter 7 and the diffraction grating 8, and a fourth lens 10 disposed between the second diffraction grating 8 and the output fiber bundle 9. The optical filter F1 as described above is arranged to be capable of changing wavelength pass-band characteristics of light with the spatial filter 7 as described in detail hereinbelow.

In the arrangement of FIG. 1, light emitted from the input fiber bundle 1 is collimated by the lens 2 so as to be incident upon the diffraction grating 3. The incident light is dispersed as at 4 according to each wavelength by the diffraction grating 3. The dispersed light 4 incident upon the lens 5 forms an image on a focal plane of the lens 5. The transmission type spatial filter 7 disposed on the focal plane of the lens 5 is adapted to selectively transmit the dispersed light, and the dispersed light partially transmitted by the spatial filter 7 is collimated by the lens 6 so as to be incident upon the diffraction grating 8. The dispersed light is converted into non-dispersed light by the diffraction grating 8, and is coupled with the output fiber bundle 9 by the lens 10. Accordingly, by altering the transmittance with respect to a specific wavelength position X on the focal plane of the lens 5, any desired wavelength pass-band characteristics may be imparted.

The pass-band wavelength region is represented by the following equation, $$\delta\lambda = d \cdot \cos(\theta) \cdot \delta x / f$$

wherein f is the focal length of the lenses 5 and 6, d is the grating interval of the diffraction gratings 3 and 8, $\theta$ is the incident angle to the grating, $\lambda$ is the working wavelength, $\delta x$ is the pass-band width of the spatial filter, and $\delta\lambda$ is the pass-band wavelength region.

The relation between spatial transmittance and wavelength of the spatial filter 7 in the case where the focal length of the lenses 5 and 6 is set to 10 mm, the groove pitch of the diffraction gratings 3 and 8 to 1.5 $\mu$m, and the working wavelength, to 1.5 $\mu$m is shown in FIGS. 2 and 3.

Figure 2A:
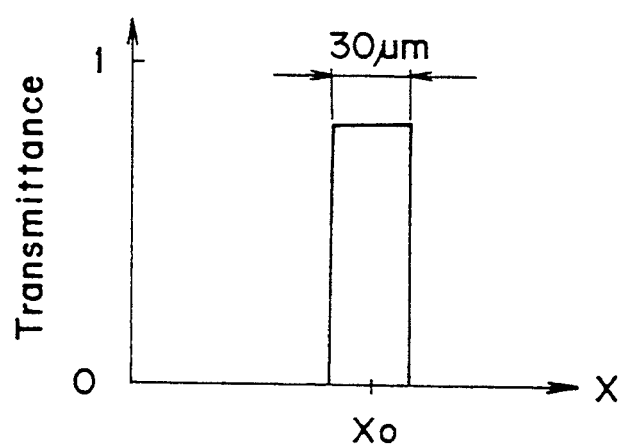
FIGS. 2(a) and 2(b) are diagrams showing a relation between spatial transmittance of a spatial filter and wavelengths in connection with the embodiment of FIG. 1, FIG. 3(a) and 3(b) are also diagrams showing another relation between spatial transmittance and wavelengths in connection with the embodiment of FIG. 1.
Figure 2B:
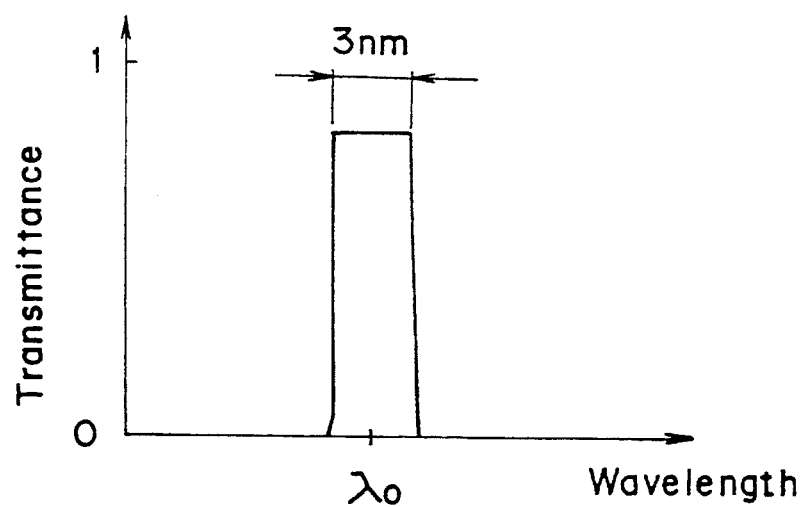
Figure 3A:
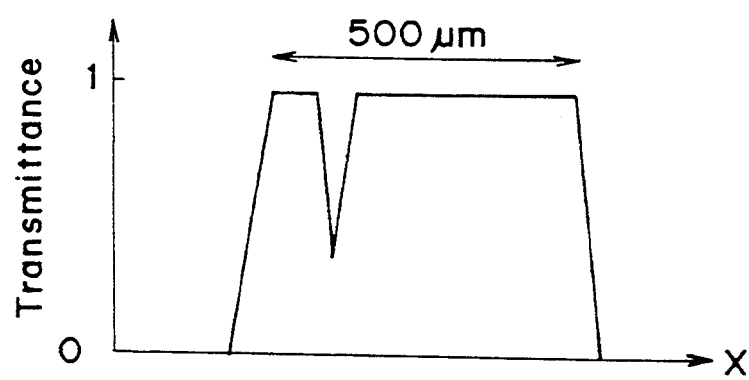
Figure 3B:
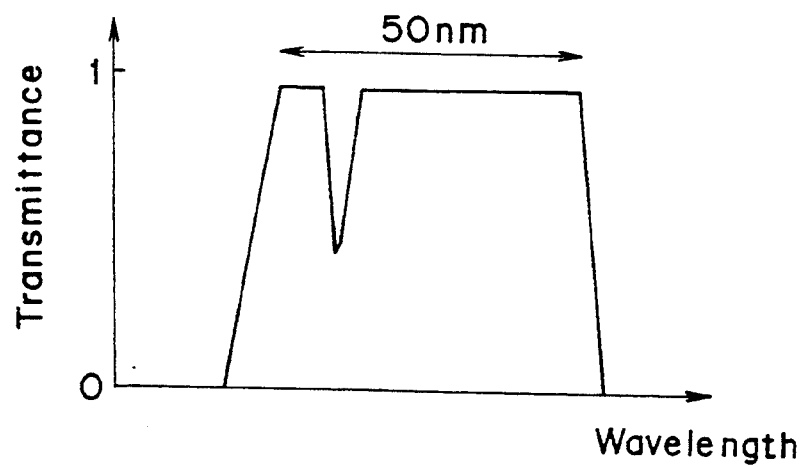

FIGS. 2(a) and 2(b) and 3(a) and 3(b) show the relations between the spatial transmittance of the spatial filter 7 and the wavelength. FIGS. 2(a) and 2(b) relate to the case where a slit-like aperture having a transmittance as shown in FIG. 2(a) is employed for the spatial filter 7, and at this time, the spatial filter 7 has the wavelength transmission characteristics as shown in FIG. 2(b) for the optical band-pass filter which allows only a specific band to pass therethrough. By altering the effective width of the slit thereof, the pass wavelength band can be changed, while the pass wavelength is determined by the relative position of the slit thereof. FIGS. 3(a) and 3(b) show another relation between the spatial transmittance and wavelength.

Figure 4:
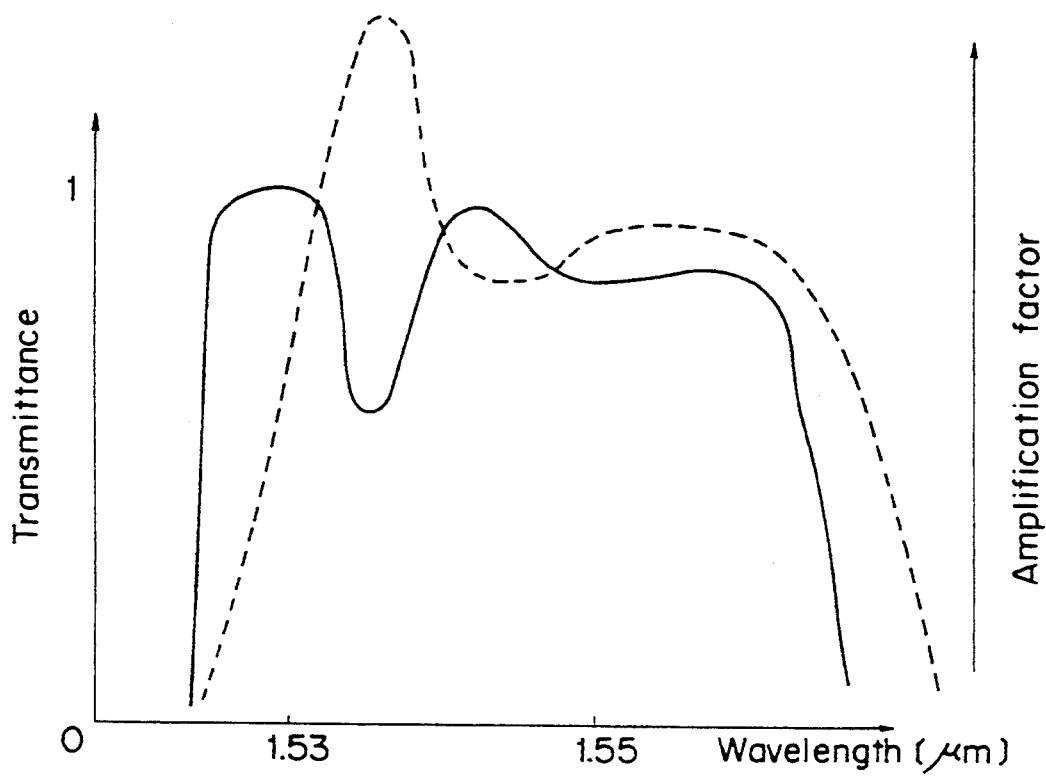
FIG. 4 is a diagram showing wavelength pass-band characteristics of the optical filter of FIG. 1.
Figure 5:
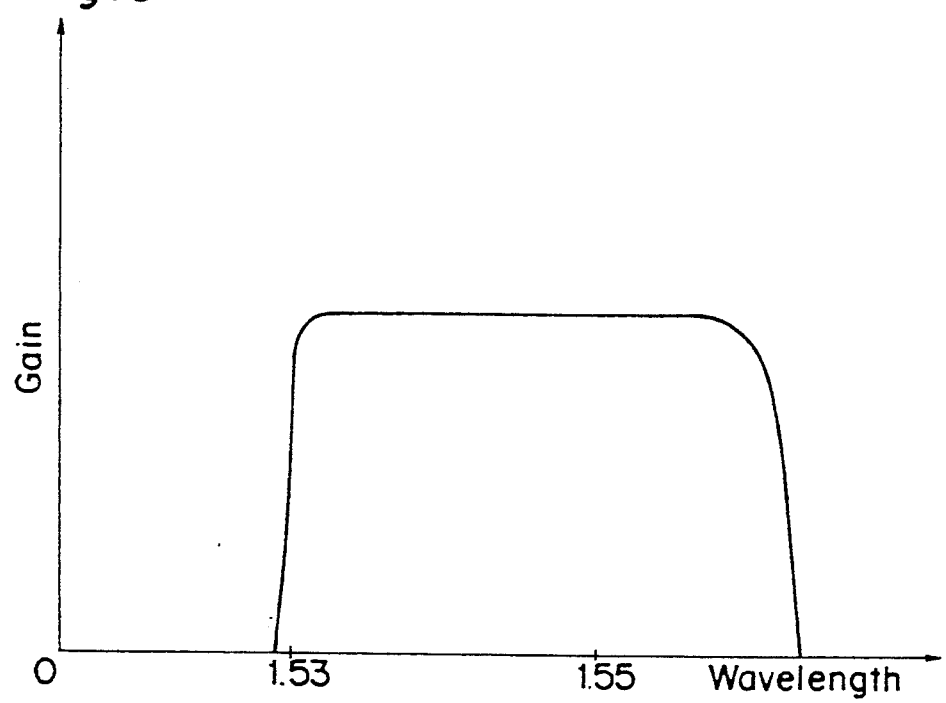
FIG. 5 is a diagram representing wavelength amplification characteristics of one preferred embodiment of an optical amplifier according to the present invention.

From such examples, it is seen that in the present invention, the spatial transmission characteristics correspond to the wavelength characteristics, and any desired wavelength pass characteristics can be readily obtained. Accordingly, if the pass-band, which becomes an inverse characteristic (represented by a solid line) with respect to the wavelength amplification factor characteristic of an erbium-doped optical fiber amplifier as (shown by a dotted line in FIG. 4) has been given to the spatial filter 7, the wavelength amplification characteristics of the optical fiber amplifier may be made uniform as shown in FIG. 5. Thus, even when the optical amplifiers are connected in multiple stages, uniform wavelength division multiplexed light signals can be transmitted, with a constant level being maintained.

For the spatial filter 7, a spatial modulation element such as a liquid crystal panel or the like may be employed instead of the slit, dry plate, etc.

Meanwhile, for the diffraction grating 3, a Fourier diffraction grating satisfying the conditions as follows should preferably be used.

$$0.5\lambda < d < 1.5\lambda, \text{ and}$$

$$0.2d < h < 0.5d$$

where $\lambda$ is the working wavelength, d is the groove pitch of the diffraction grating, and h is the depth of the grating groove.

It should be noted here that the Fourier diffraction grating is a grating having a shape whose cross section is represented by superposition of a fundamental sine wave and its higher infinite harmonic.

Figure 12:
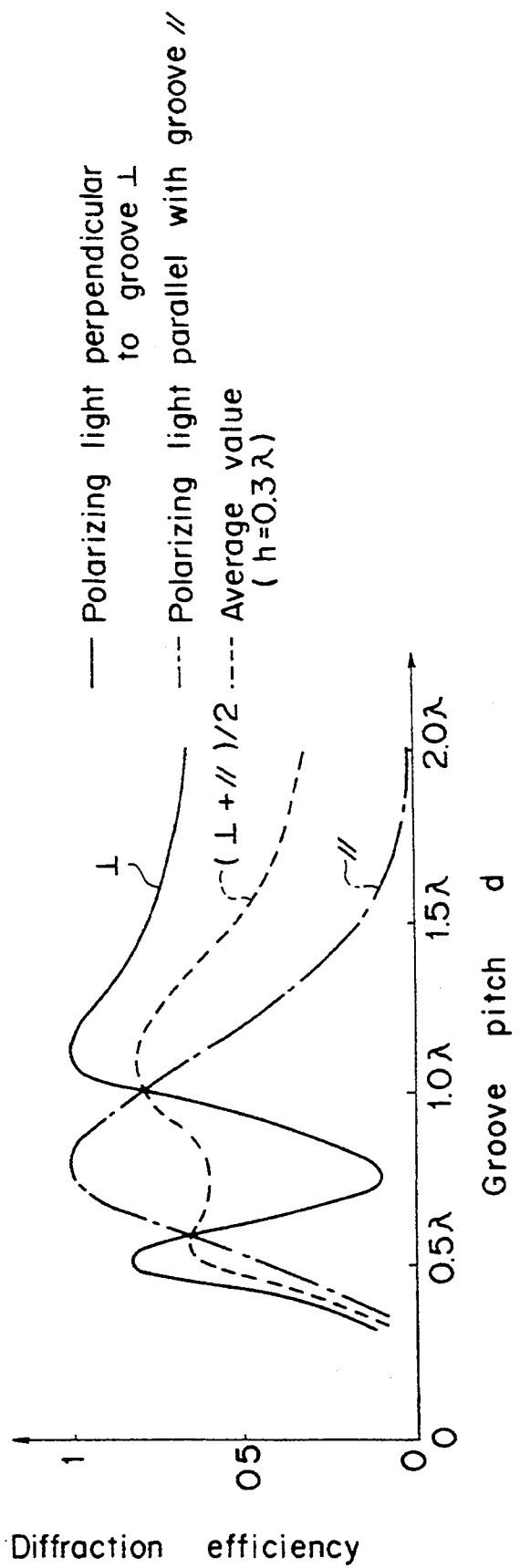
FIG. 12 is a characteristic diagram showing a relation between grating or groove interval and diffraction efficiency in the diffraction grating.
Figure 13:
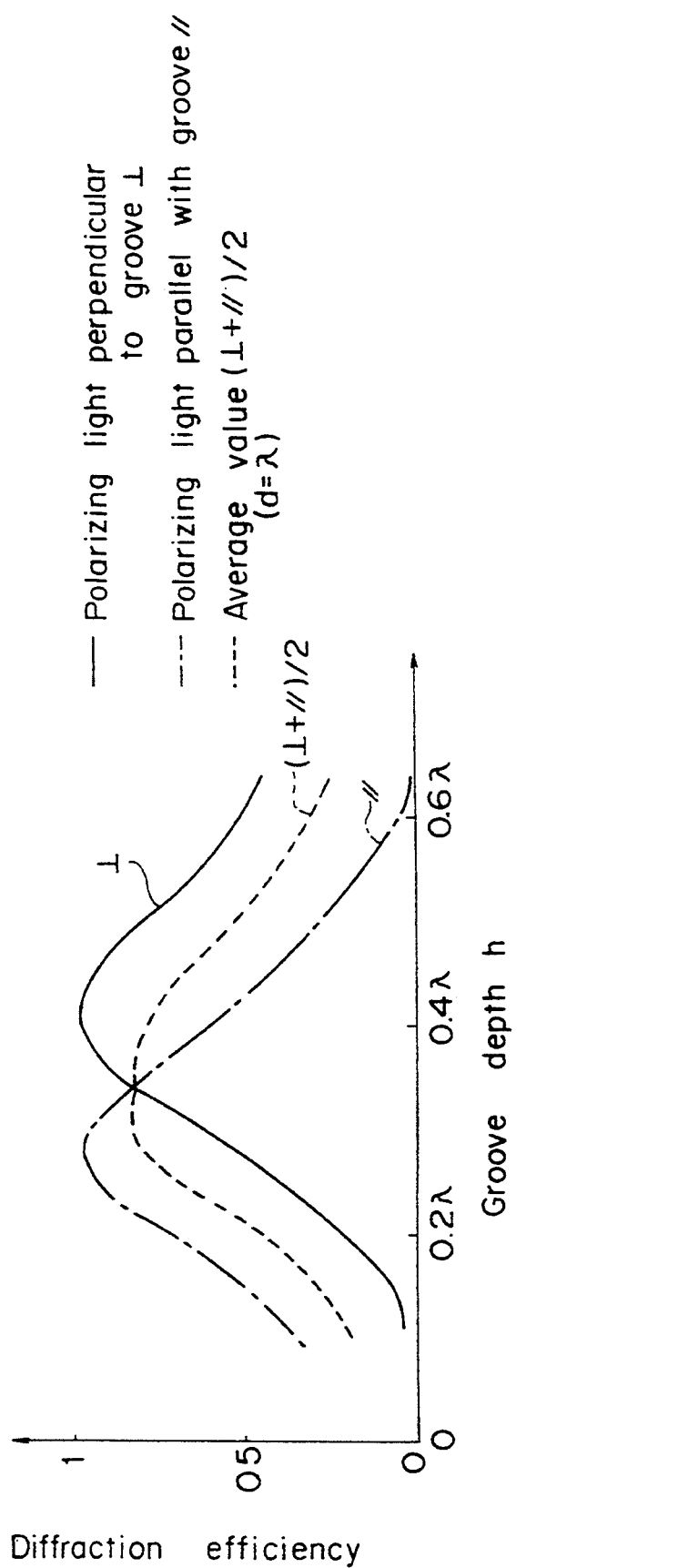
FIG. 13 is a characteristic diagram showing a relation between groove depth and diffraction efficiency in the diffraction grating.

A graphical diagram in FIG. 12 shows relation in characteristics between the groove pitch and the efficiency of a primary diffraction light in the Fourier diffraction grating, while that in FIG. 13 represents relations between the groove depth and the efficiency of the primary diffraction light also in the Fourier diffraction grating. The solid line relates to a case where polarization of the incident light is perpendicular with respect to the groove of the grating, the one-dotted chain line, to the case where polarization of the incident light is parallel with respect to the groove of the grating, and the dotted line represents the average value. When the grating interval d becomes smaller than 1.5$\lambda$, diffraction light higher than the secondary diffraction light is not produced, and therefore, the primary diffraction efficiency is high. Meanwhile, when the grating interval d becomes smaller than 0.5$\lambda$, the diffraction efficiency is reduced to half. Similarly, if the grating groove depth h becomes deeper than 0.5d, the diffraction grating is also reduced to half. When the grating depth h is smaller than 0.2d, the diffraction efficiency is lowered to half.

The Fourier diffraction grating which meets the above conditions has a small polarization dependency with respect to the incident light, and exhibits high diffraction efficiency. Therefore, in the optical filter, favorable characteristics with small loss and noise may be obtained.

More preferably, if the end faces of the input fiber bundle 1 and the output fiber bundle 9 are cut slantwise or are polished as shown at 1a and 9a in FIG. 1, the amount of reflection attenuation is resulting in a corresponding reduction in noise which may be generated in the optical amplifier.

FIG. 6 is a block diagram of an optical amplifier employing the optical filter according to the present invention.

In FIG. 6, the signal light 23 is combined, by an optical combiner 24, with exciting light 25 from an exciting light source 26 so as to be incident upon an optical amplification fiber portion 22, in which the optical filter 21 as described earlier with reference to FIG. 1 is provided, and thus, amplified light 27 is emitted from the end of the optical amplification fiber portion 22.

It is to be noted that the optical filter 21 shown in FIG. 1 is provided in the fiber portion 22 having the optical amplification function.

Figure 7A:
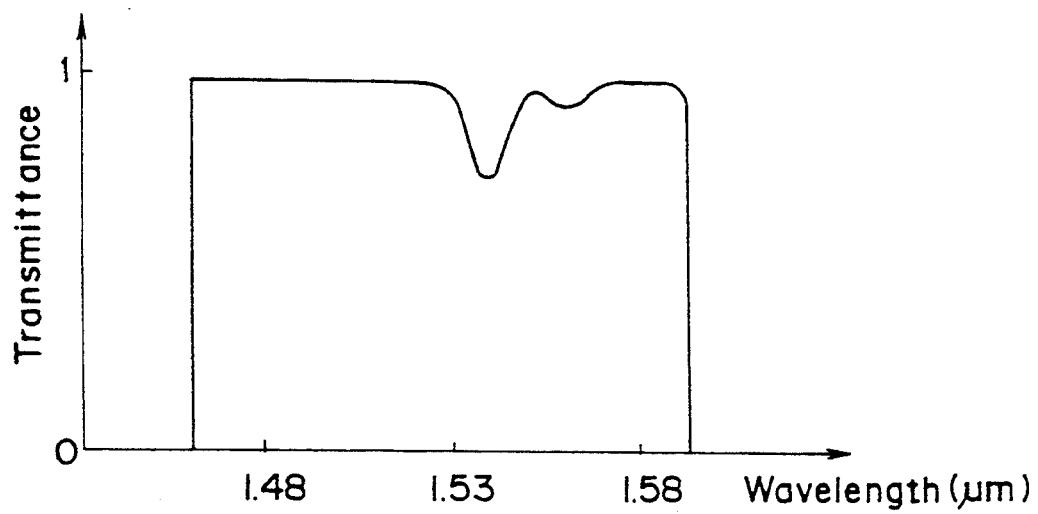
FIGS. 7(a) and 7(b) are wavelength pass-band characteristic diagrams for the optical filter.

FIG. 7(a) shows the pass-band characteristics of the optical filter 21 according to the present invention. In the case where the erbium-doped fibers are employed for the fibers, the amplification wavelength band region of 1.5 μm, and exciting wavelengths of 0.98 to 1.48μm, shorter than the above may be obtained, and therefore, the exciting wavelength region is also allowed to pass in the pass-band characteristics.

Figure 7B:
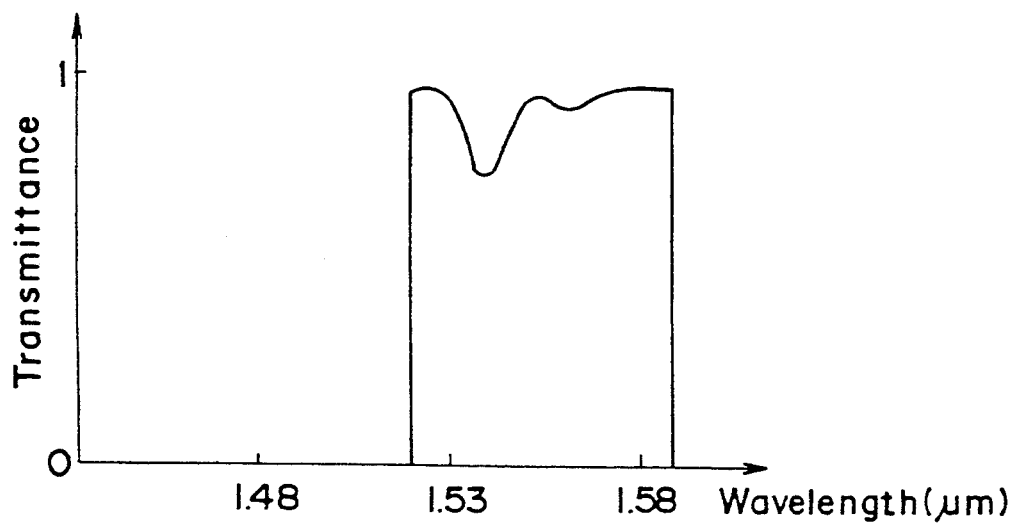

Meanwhile, the optical filter 21 may be disposed at the emitting end of the light amplification fiber section 22. In this case, the pass-band region may be narrowed as shown in FIG. 7(b) in order to eliminate the exciting light 25. By such arrangement, an optical amplifier having a flat pass wavelength region can be provided.

Figure 8:
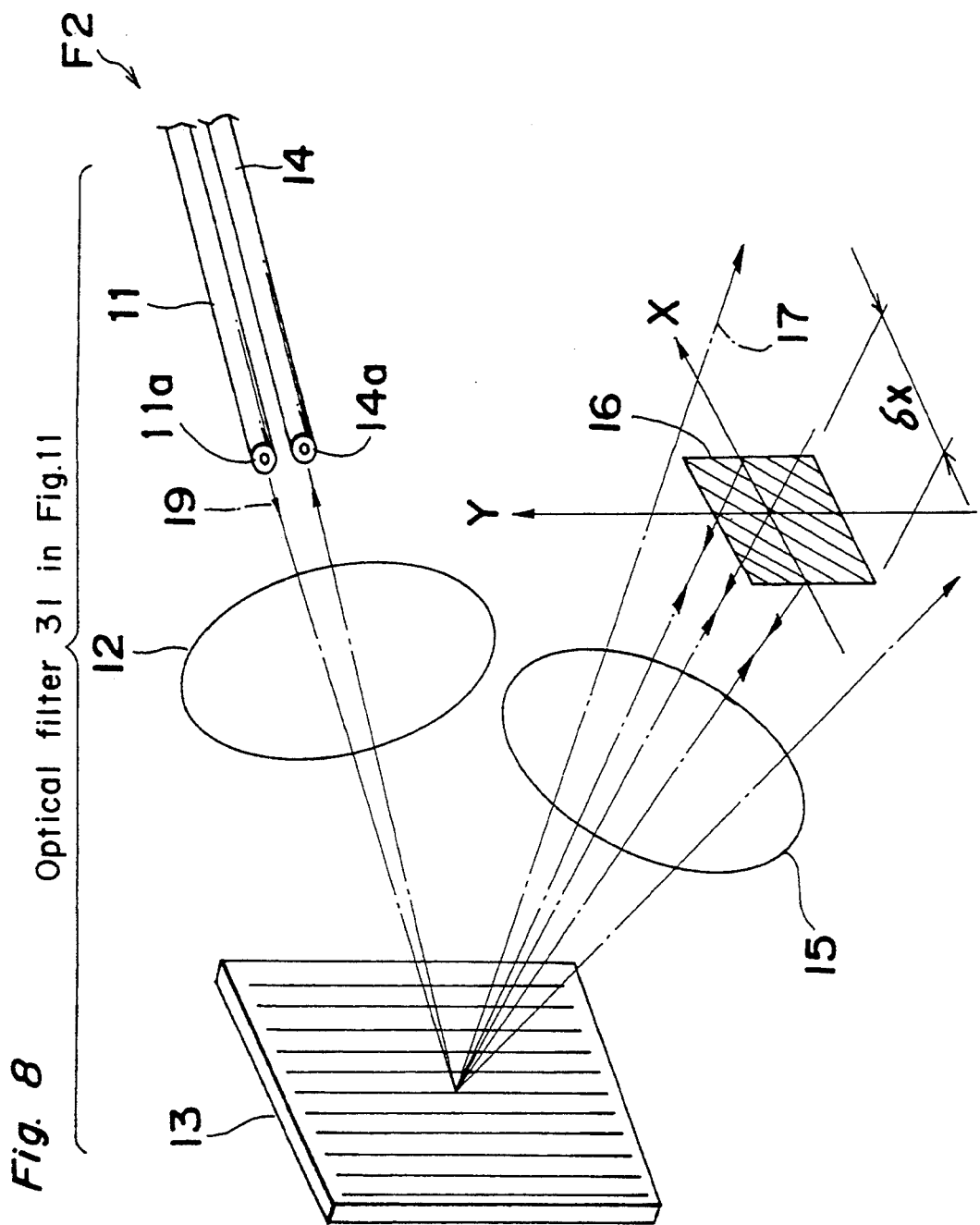
FIG. 8 is a diagram similar to FIG. 1, which illustrates to another embodiment of the present invention.

FIG. 8 shows another embodiment of an optical filter F2 according to the present invention, which generally includes an input fiber bundle 11 and an output fiber bundle 14 disposed in a parallel relation to each other, a diffraction grating 13, a reflecting mirror 16, a lens 12 disposed between the ends of the input and output fiber bundles 11 and 14 and the diffraction grating 13, and another lens 15 disposed between said diffraction grating 13 and said reflecting mirror 16 as illustrated.

In FIG. 8, light emitted from the input fiber 11 is collimated by the lens 12, and is incident upon the diffraction grating 13. The incident light 19 is dispersed according to its wavelength by the diffraction grating 13. The dispersed light forms an image on the focal plane of the lens 15 according to the wavelength. The reflecting mirror 16 is disposed on the focal plane of the lens 15 for selectively reflecting the dispersed light. The dispersed light thus reflected is again incident upon the diffraction grating 13 through the lens 15. A Y-axis of the reflecting mirror 16 is slightly inclined about an X axis thereof with respect to the direction of grooves of the diffraction grating 13. By the diffraction grating 13, the dispersed light becomes nondispersed light so as to be coupled with the output fiber bundle 14. Accordingly, by altering the reflectance with respect to the specific wavelength position of the reflecting mirror 16, any desired wavelength pass-band characteristic may be obtained.

The pass-band wavelength region is represented by the following equation, $$\delta\lambda = d \cdot \cos(\theta) \cdot \delta x / f$$

wherein f is the focal length of the lens 15, d is the groove pitch of the diffraction grating 13, $\theta$ is the incident angle to the grating, $\delta$ is the working wavelength, $\delta x$ is the passband width of the reflecting mirror 16, and $\delta\lambda$ is the passband wavelength region.

Figure 9A:
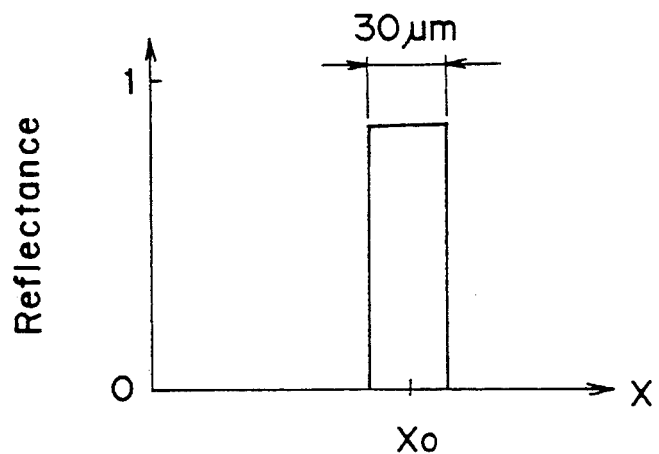
FIGS. 9(a) and 9(b) are diagrams showing a relation between spatial reflectance characteristic and the pass-band characteristic of a reflecting mirror means in the embodiment of FIG. 8, FIGS. 10(a) to 10(b) are diagrams similar to FIGS. 9(a) and 9(b), but which particularly relate to another reflecting mirror means.
Figure 9B:
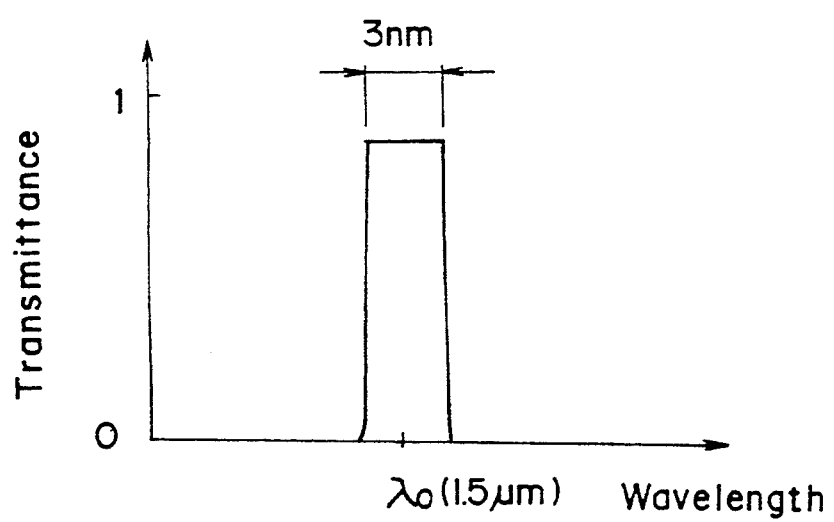

The relation between spatial reflectance and pass wavelength of the reflecting mirror 16 in the case where the focal length of the lens 15 is set to 10 mm, the grating interval of the diffraction grating 13 to 1.5 μm, and the working wavelength to 1.5 μm is shown in FIGS. 9(a) and 9(b).

FIG. 9(a) shows the relation between the spatial reflectance of the reflecting mirror 16 and the wavelength, with the dispersing direction of the diffraction grating 13 being represented by X.

FIGS. 9(a) and 9(b) relate to the case where a slit-like mirror is employed for the reflecting mirror 16 and the wavelength transmission characteristics thereof is as shown in FIG. 9(b) for the optical band-pass filter which allows only a specific band to pass therethrough. By altering the slit width $\delta x$ thereof, the pass wavelength band $\delta\lambda$ can be changed, while the pass wavelength $\delta_{74}$ is determined by the slit position $X_{74}$ thereof.

Figure 10:
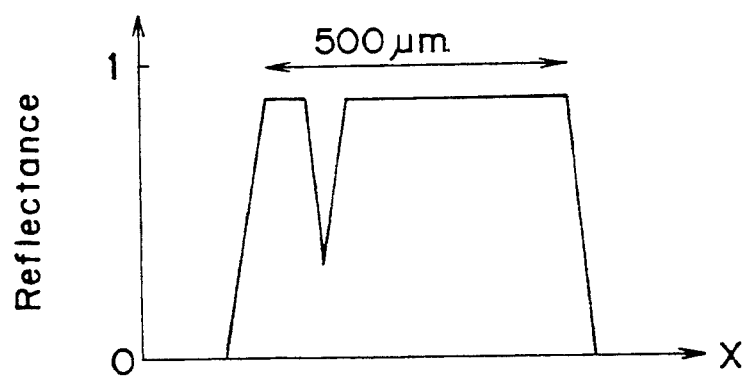
Figure 10:
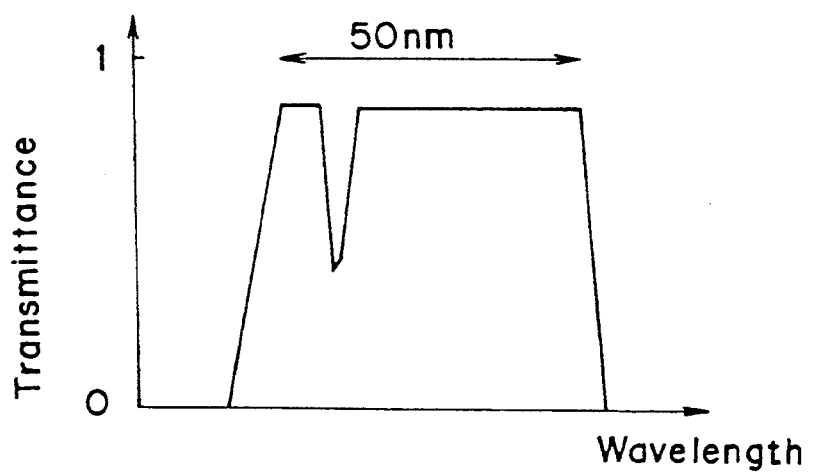

FIGS. 10(a) and 10(b) show a relation between the spatial reflectance of another reflecting mirror 16 and wavelength. As is seen from these examples, in the present invention, the spatial reflecting characteristics correspond to the wavelength characteristics, and any desired wavelength pass characteristics can be readily obtained. Accordingly, if the pass-band having the inverse characteristic of the wavelength amplification factor of an erbium-doped optical fiber amplifier as shown in FIG. 4 has been given to the reflecting mirror 16, the wavelength amplification characteristics of the optical fiber amplifier may be made uniform. Thus, even when the optical amplifiers are connected in multiple stages, uniform wavelength multiple light signals can be transmitted. Moreover, by the employment of the reflecting optical system, the number of parts is few. i.e. the system can be compact.

For the reflecting mirror 16, a spatial modulation element such as a liquid crystal panel or the like may be employed instead of the slit.

Meanwhile, for the diffraction grating 19, a Fourier diffraction grating satisfying the conditions as follows should preferably be used.

$$0.5\lambda < d < 1.5\lambda, \text{ and}$$

$$0.2d < h < 0.5d$$

where $\lambda$ is the working wavelength, d is the groove pitch of the diffraction grating, and h is the depth of the grating groove.

The Fourier diffraction grating which meets the above conditions has a small polarization dependency with respect to the incident light, and exhibits high diffraction efficiency for the same reason as explained earlier with respect to the first embodiment. Therefore, in the optical filter, favorable characteristics with small loss and noise may be obtained.

More preferably, if the end faces of the input fiber bundle 11 and the output fiber bundle 14 are cut slantwise or polished as shown at 11a and 14a in FIG. 8, the amount of reflection attenuation is lowered resulting in a corresponding reduction noise.

Moreover, if the diffraction grating 13 and the input and output fiber bundles 11 and 14 are disposed in a retro-optical arrangement, the lens 12 and the lens 15 may be replaced by one common lens.

Figure 11:
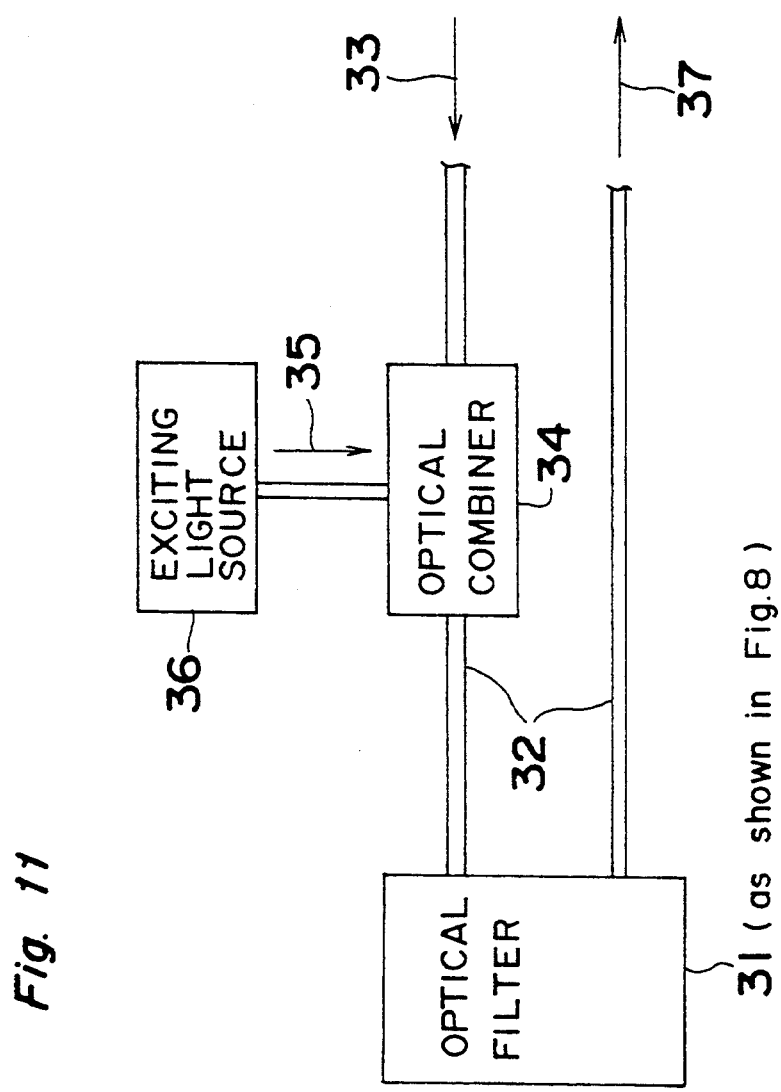
FIG. 11 is a schematic block diagram similar to FIG. 6, but which particularly relates to another embodiment of an optical amplifier.

FIG. 11 is a block diagram of an optical amplifier employing the optical filter according to the present invention.

In FIG. 11, the signal light 33 is combined by an optical combiner 34, with exciting light 35 from an exciting light source 36 so as to be incident upon an optical amplification fiber portion 32, in which the optical filter 31 as described earlier with reference to FIG. 8 is provided, and thus, amplified light 37 is emitted from the end of the optical amplification fiber portion 32.

FIG. 7(a) also shows the pass-band characteristics of the optical filter 31 according to the above embodiment. In the case where the erbium-doped fibers are employed for the fibers, the amplification wavelength band region of 1.5 μm, and exciting wavelengths of 0.98 to 1.48 μm, shorter than the above may be obtained, and therefore, the exciting wavelength region must also be allowed to pass in the pass-band characteristics of the optical filter.

Meanwhile, the optical filter 31 may be disposed at the emitting end of the light amplification fiber portion. In this case, the pass-band region may be narrowed as shown in FIG. 7(b) in order to eliminate the exciting light 35. By such arrangement, an optical amplifying device having a flat pass wavelength region can be provided.

In the present invention, the amplification fibers need not necessarily be limited in those to which erbium has been added, but fibers for amplification of 1.3 μm band employing, for example, praseodymium, neodymium or the like may also be employed. Similarly, a semi-conductor type optical amplifier may also be used.

Moreover, according to the present invention, a concave diffraction grating or non-equal interval curve grating can also be used, in which case the lenses may be dispensed with to achieve a further reduction in the size of the optical amplifying device.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An optical filter comprising: an input fiber bundle and an output fiber bundle for guiding light, a diffraction grating disposed beside each of the input and output fiber bundles, a spatial filter provided beside the diffraction grating disposed beside each of the input and output fiber bundles, and a lens disposed in an optical path between said spatial filter and the diffraction grating disposed beside each of the input and output fiber bundles, said diffraction grating disposed beside each of the input and output fiber bundles having reflective surfaces oriented relative to said spatial filter so as to reflect light from said input fiber bundle in a dispersed pattern towards said spatial filter and to reflect light coming from the spatial filter toward said output fiber bundle, respectively, and said spatial filter having a transmittance that varies with respect to the direction in which the light is dispersed by the respective reflective surface towards said spatial filter.

2. An optical filter as claimed in claim 1, wherein said diffraction grating disposed beside each of the input and output fiber bundles comprises a Fourier diffraction grating which satisfies the conditions $$0.5\lambda < d < 1.5\lambda, \text{ and}$$

$$0.2d < h < 0.5d$$

wherein $\lambda$ represents a design wavelength, d is a pitch of grooves of the Fourier diffraction grating, and h is the depth of the grooves.

3. An optical filter as claimed in claim 1, wherein end faces of said input and output fiber bundles are inclined relative to longitudinal axes of the fiber bundles, respectively.

4. An optical filter as claimed in claim 1, wherein said diffraction grating disposed beside each of the input and output fiber bundles comprises a concave diffraction grating.

5. An optical filter as claimed in claim 1, wherein said diffraction grating is dispose beside each of the input and output fiber bundles comprises a non-equal interval curve grating.

6. An optical filter comprising: an input fiber bundle and an output fiber bundle for guiding light, a diffraction grating disposed beside said input and output fiber bundles, a lens disposed between said diffraction grating and each of said input and output fiber bundles, a reflecting mirror disposed beside said diffraction grating, another lens disposed between said diffraction grating and said reflecting mirror, spacial reflectance of said mirror being alterable such that the optical filter is capable of changing wavelength pass-band characteristics of light.

7. An optical filter as claimed in claim 6, wherein said diffraction grating is a Fourier diffraction grating which satisfies the conditions $$0.5\lambda < d < 1.5\lambda, \text{ and}$$

$$0.2d < h < 0.5d$$

wherein $\lambda$ represents a design wavelength, d is a pitch of grooves of the Fourier diffraction grating, and h is the depth of the grooves.

8. An optical filter as claimed in claim 6, wherein end faces of said input and output fibers bundles are inclined relative to longitudinal axes of the fiber bundles, respectively.

9. An optical filter as claimed in claim 6, wherein said diffraction grating is a concave diffraction grating.

10. An optical filter as claimed in claim 6, wherein said diffraction grating is a non-equal interval curve grating.

11. An optical amplifier comprising: an input filter including an input fiber bundle and an output fiber bundle for guiding light, a diffraction grating disposed beside said input and output fiber bundles, a lens disposed between said diffraction grating and each of said input and output fiber bundles, a reflecting mirror disposed beside said diffraction grating, another lens disposed between said diffraction grating and said reflecting mirror, spacial reflectance of said mirror being alterable such that the optical filter is capable of changing wavelength pass-band characteristics by altering characteristics of said reflecting mirror; an amplification fiber portion connected to at least one of the input fiber bundle and the output fiber bundle, said amplification fiber portion including optical fibers comprising a rare earth element; and a light source connected to said amplification fiber portion such that light from said light source optically excites the rare earth element of the fibers of said amplification fiber portion.

12. An optical amplifier comprising: an optical filter including an input fiber bundle and an output fiber bundle for guiding light, a diffraction grating disposed beside said input and output fiber bundles, a lens disposed between said diffraction grating and each of said input and output fiber bundles, a reflecting mirror disposed beside said diffraction grating, another lens disposed between said diffraction grating and said reflecting mirror, spacial reflectance of said mirror being alterable such that the optical filter is capable of changing wavelength pass-band characteristics by altering characteristics of said reflecting mirror; and an optical semi-conductor element connected to said filter.

13. An optical amplifier comprising: an optical filter including an input fiber bundle and an output fiber bundle for guiding light, a diffraction grating disposed beside each of the input and output fiber bundles, a spatial filter provided beside the diffraction grating disposed beside each of the input and output fiber bundles, and a lens disposed in an optical path between said spatial filter and the diffraction grating disposed beside each of the input and output fiber bundles, said spatial filter having a transmittance that varies in a predetermined direction; an amplification fiber portion connected to at least one of the input fiber bundle and the output fiber bundle of said optical filter, said amplification fiber portion having optical fibers comprising a rare earth element; and a light source connected to said amplification fiber portion such that light from said light source optically excites the rare earth element of the fibers of said amplification fiber portion.

14. An optical amplifier comprising: an optical filter including an input fiber bundle and an output fiber bundle for guiding light, a diffraction grating disposed beside each of the input and output fiber bundles, a spatial filter provided beside the diffraction grating disposed beside each of the input and output fiber bundles, and a lens disposed in an optical path between said spatial filter and the diffraction grating disposed beside each of the input and output fiber bundles, said spatial filter having a transmittance that varies in a predetermined direction; and an optical semi-conductor element connected to said filter.

15. An optical amplifier comprising: an optical filter including an input fiber bundle and an output fiber bundle for guiding light, a diffraction grating disposed beside each of the input and output fiber bundles, a spatial filter provided beside the diffraction grating disposed beside each of the input and output fiber bundles, and a lens disposed in an optical path between said spatial filter and the diffraction grating disposed beside each of the input and output fiber bundles, said diffraction grating disposed beside each of the input and output fiber bundles having reflective surfaces oriented relative to said spatial filter so as to reflect light from said input fiber bundle in a dispersed pattern towards said spatial filter and to reflect light coming from the spatial filter toward said output fiber bundle, respectively, and said spatial filter having a transmittance that varies with respect to the direction in which the light is dispersed by the respective reflective surface towards said spatial filter; an amplification fiber portion connected to at least one of the input fiber bundle and the output fiber bundle of said optical filter, said amplification fiber portion having optical fibers comprising a rare earth element; and a light source connected to said amplification fiber portion such that light from said light source optically excites the rare earth element of the fibers of said amplification fiber portion.

16. An optical amplifier comprising: an optical filter including an input fiber bundle and an output fiber bundle for guiding light, a diffraction grating disposed beside each of the input and output fiber bundles, a spatial filter provided beside the diffraction grating disposed beside each of the input and output fiber bundles, and a lens disposed in an optical path between said spatial filter and the diffraction grating disposed beside each of the input and output fiber bundles, said diffraction grating disposed beside each of the input and output fiber bundles having reflective surfaces oriented relative to said spatial filter so as to reflect light from said input fiber bundle in a dispersed pattern towards said spatial filter and to reflect light coming from the spatial filter toward said output fiber bundle, respectively, and said spatial filter having a transmittance that varies with respect to the direction in which the light is dispersed by the respective reflective surface towards said spatial filter; and an optical semi-conductor element connected to said filter.

* * * * *